United States Patent
Kogame et al.

(10) Patent No.: US 6,674,492 B1
(45) Date of Patent: Jan. 6, 2004

(54) FILTER AND IMAGE DEVICE WITH FILTER

(75) Inventors: Akiyoshi Kogame, Kanagawa (JP); Makoto Matsumoto, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/926,308

(22) PCT Filed: Apr. 12, 2000

(86) PCT No.: PCT/JP00/02363
§ 371 (c)(1),
(2), (4) Date: Oct. 11, 2001

(87) PCT Pub. No.: WO00/62536
PCT Pub. Date: Oct. 19, 2000

(30) Foreign Application Priority Data

Apr. 13, 1999 (JP) .......................................... 11-105344

(51) Int. Cl.⁷ ............................................. G02F 1/1335
(52) U.S. Cl. ............................. 349/10; 349/48; 349/73; 257/59; 257/72
(58) Field of Search ............................. 349/10, 73, 48, 349/104; 257/59, 72

(56) References Cited

U.S. PATENT DOCUMENTS

2003/0085649 A1 * 5/2003 Wach et al. ................. 313/479

FOREIGN PATENT DOCUMENTS

| EP | 0 834 898 | 4/1998 |
|----|-----------|--------|
| EP | 0 887 834 | 12/1998 |
| EP | 0 910 107 | 4/1999 |
| EP | 0 977 167 | 2/2000 |
| EP | 1 237 141 | * 9/2002 |
| JP | 4-9091 | 1/1992 |
| JP | 4-9092 | 1/1992 |
| JP | 4-9093 | 1/1992 |
| JP | 11-338383 | 12/1999 |

* cited by examiner

*Primary Examiner*—Nathan J. Flynn
*Assistant Examiner*—Ahmed J. Sefer
(74) *Attorney, Agent, or Firm*—Oblon, Spivak, McClelland, Maier & Neustadt, P.C.

(57) ABSTRACT

A transparent filter including a sheet-shaped body and numerous linear conductive elements arrayed on a surface thereof, which is adapted to be disposed in front of an image device having rectangular pixels; wherein the conductive elements with a linewidth of 50 µm or less are arrayed on the sheet-shaped body in two directions with a pitch P1 and a pitch P2, respectively; an aperture ratio of the filter is not less than 70%; and when lengths of a pixel of the image device in the vertical direction Y and in the horizontal direction X are denoted by W1 and W2, respectively, P1, P2, W1 and W2 satisfy a relation expressed by the following Equation (1) and Equation (2), $$n1+0.35 \leq W1/P1 \leq n1+0.65 \quad (1)$$

$$n2+0.35 \leq W2/P2 \leq n2+0.65 \quad (2)$$

The use of the transparent filter can increase the aperture ratio in comparison with that of a conventional mesh, and besides the disposal thereof in front of an image device having rectangular pixels can make the moire inconspicuous.

10 Claims, 2 Drawing Sheets

FILTER AND IMAGE DEVICE WITH FILTER

TECHNICAL FIELD

The present invention relates to a filter and an image device with a filter.

BACKGROUND ART

Unwanted electromagnetic waves that electronic equipments produce may induce error operations in other electronic equipments so that their strict control within the limit of possibility is called for. In housings of electronic equipments, for example, these electromagnetic waves are restrained by means of interior metal plating or the like. On the other hand, for screens of image display devices such as CRTs (Cathode Ray Tubes), filters for the frontal surface are attached thereto with the purpose of suppressing the transmission of unwanted electromagnetic waves. Since such a filter for the frontal surface requires the transparency, layers composed of a fabric in mesh (referred to as a "mesh" hereinafter) with a conductivity, a transparent conductive film or such and a transparent substrate have been being utilized therein.

Further, in Japanese Patent Application Laid-open No. 211798/1991, there is disclosed an electromagnetic shielding plate that is two of transparent plates on which arrays of numerous conductive lines are fixed being put together.

In recent years, the plasma display panel (referred to as the "PDP" hereinafter) that is an image display equipment making use of the plasma discharge effect has been developed. The PDP, however, produces a large amount of unwanted electromagnetic radiation and, thus, what is required as a filter for its frontal surface is a filter having a strong suppression effect on the transmission of electromagnetic waves. Furthermore, in the PDP, the plasma discharge brings about the light radiation in the wavelength range of 850 to 1000 nm, which may cause an error operation in a remote control box for the PDP operations. Consequently, it is required that the filter for the frontal surface can also suppress the transmission of the light in this wavelength region. Further, since the PDP is a flat panel display with a large screen and, as the main body of the panel, a thin glass electrode substrate of a large size is employed, the filter for the frontal surface is also asked to fulfil the function of protecting that from the damage.

As a filter for the PDP frontal surface capable to serve all these functions, there is in use, for instance, a filter disclosed in Japanese Patent Application Laid-open No. 247583/1997, wherein a conductive mesh made of polyester filaments which are covered, in succession, with copper and nickel is laid on a transparent resin sheet that is provided with a function of absorbing the light in the near infrared region.

In order to show bright images even when a filter is placed in front of an image device, it is essential to enhance the transmittance of the filter for the light beam. Nevertheless, when the diameter of filaments or the like which constitute the mesh in the filter is set thin and besides the pitch of the mesh is set wide, for the sake of increasing the transmittance of the filter for the light beam, a dispersion in spacing of the mesh becomes large, making the appearance poor. In effect, it is difficult to manufacture a mesh whose aperture ratio that is a ratio of the transparent section per unit area is not less than 70%, and a filter with a high transmittance for the light beam has not been obtained yet.

Moreover, mutual interference between two types of line groups, which are a group of borderlines between pixels and a group of lines constituting the mesh, brings about the moire. For a method to make the moire inconspicuous, there is first considered a method wherein the line diameter is made thinner and thereby the moire is made inconspicuous, but the fabrication of a mesh with a thin line diameter is difficult, due to the above reasons. Another method therefor is a method wherein the pitch of the mesh is set to be a pitch where the moire becomes inconspicuous. Meanwhile, the mesh is, in general, plain weave, having lines which intersect at right angles and equal pitches in two directions. In contrast with this, lengths of a pixel of an image device in the vertical direction and in the horizontal direction are not generally equal. Therefore, when a mesh is placed in front of an image device, there are certain cases in which, while the moire resulting from the mutual interference between the group of borderlines of pixels in the vertical direction and the group of lines of the mesh in the vertical direction is inconspicuous, the moire caused by the mutual interference between the group of borderlines of pixels in the horizontal direction and the group of lines of the mesh in the horizontal direction is conspicuous. Conversely, in some cases, although the moire resulting from the mutual interference between line groups in the horizontal direction is inconspicuous, the moire caused by the mutual interference between line groups in the vertical direction is conspicuous. In order to make the moire inconspicuous, there is, in addition, another method wherein the lines of the mesh are arranged to make angles of, for example, 45 degrees or so with respect to the borderlines of pixels.

However, when these angles are to be set at or above 20 degrees, in other words, when the crossing angles between borderlines of pixels and lines of the mesh are to be set at or above 20 degrees, in fabricating a filter, a large amount of end sections of the mesh must be cut and removed so that a problem of high production cost for the filter arises.

Further, in Japanese Patent Application Laid-open No.211798/1991, with regard to techniques of the moire prevention, nothing is disclosed or suggested.

DISCLOSURE OF THE INVENTION

An object of the present invention is to provide a filter which has a higher aperture ratio than the one utilizing a conventional conductive mesh made of polyester filaments which are covered, in succession, with copper and nickel. Another object of the present invention is to provide, by disposing this filter in front of an image device with rectangular pixels, an image device of high quality without any conspicuous moire.

The present invention relates to a transparent filter comprising a sheet-shaped body and numerous linear conductive elements arrayed on a surface thereof, which is adapted to be disposed in front of an image device having rectangular pixels; wherein the conductive elements with a linewidth of 50 μm or less are arrayed on the sheet-shaped body in two directions with a pitch P1 and a pitch P2, respectively; an aperture ratio of the filter is not less than 70%; and when lengths of a pixel of the image device in vertical direction Y and in horizontal direction X are denoted by W1 and W2, respectively, P1, P2, W1 and W2 satisfy one of relations expressed by following equations, that is, both Equation (1) and Equation (2), both Equation (3) and Equation (4), both Equation (5) and Equation (6), or both Equation (7) and Equation (8), $$n1+0.35 \leq W1/P1 \leq n1+0.65 \tag{1}$$

$$n2+0.35 \leq W2/P2 \leq n2+0.65 \tag{2}$$

$$n1+0.35 \leq P1/W1 \leq n1+0.65 \quad (3)$$

$$n2+0.35 \leq P2/W2 \leq n2+0.65 \quad (4)$$

$$n1+0.35 \leq W1/P2 \leq n1+0.65 \quad (5)$$

$$n2+0.35 \leq W2/P1 \leq n2+0.65 \quad (6)$$

$$n1+0.35 \leq P1/W2 \leq n1+0.65 \quad (7)$$

$$n2+0.35 \leq P2/W1 \leq n2+0.65 \quad (8)$$

(Each of n1 and n2 is an integer from 1 to 5).

When this filter is disposed in front of an image device, it can be disposed in such a way that narrower angles θ1 and θ2 between angles which are formed by the directions of the lengths for the linear conductive elements of the filter with the vertical direction Y and the horizontal direction X of the image device, respectively, cannot be such large angles as a conventional angle of 45 degrees or so, but can be, in both cases, within a range of small angles of 18 degrees or less.

BEST MODE FOR CARRYING OUT THE INVENTION

Figure 1:
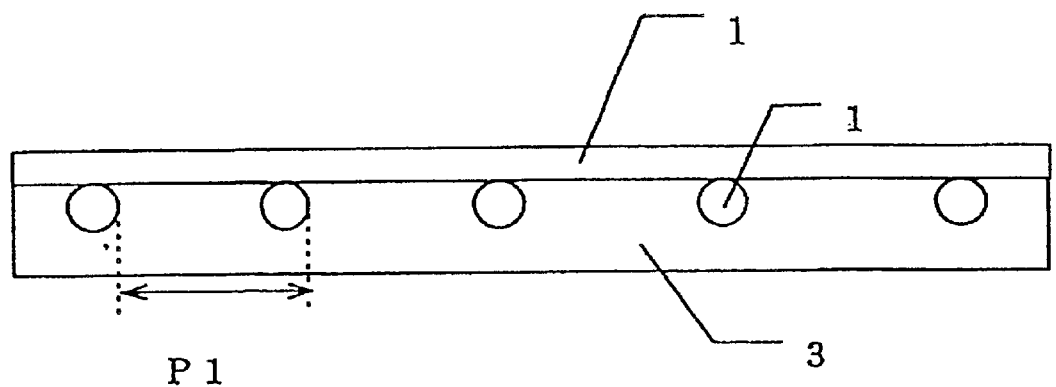
FIG. 1 is an example of a cross-sectional view showing a filter of the present invention.

As a sheet-shaped body to constitute a filter of the present invention, a transparent plate or film can be employed. In addition, a sheet-shaped body can be formed of layers with the plate(s) and/or film(s). A plate as used herein also includes a plate worked into the shape of an arch.

The plate and the film may be made of a resin or glass. Examples of resins to form the plate include acrylic based resins, polycarbonate based resins, polyolefin based resins, polystyrene based resins and the like. Examples of resins to form the film include polyester based resins, urethane based resins, acrylic based resins, polyolefin based resins, triacetate and the like.

An average transmittance of the sheet-shaped body for the light beam is preferably not higher than 30% in the wavelength range of from 850 to 1000 nm and not lower than 40% in the wavelength range of from 400 to 650 nm. When a plurality of layers form a sheet-shaped body, it is preferable that, at least, one layer of the sheet-shaped body has an average transmittance for the light beam that is not higher than 30% in the wavelength range of from 850 to 1000 nm and not lower than 40% in the wavelength range of from 400 to 650 nm. If the average transmittance for the light beam in the wavelength range of from 850 to 1000 nm is set too high, the function of cutting the near-infrared light thereof becomes ineffective, which may disadvantageously cause an error operation in a remote control box for the PDP operations. It is more preferable that the average transmittance for the light beam in the wavelength range of from 850 to 1000 nm is not higher than 20%.

For a method of controlling the transmittance for the light beam, a method through the use of an optical absorption agent, or a method through the use of a reflection film for the near-infrared light can be employed.

As an example of a method of controlling the transmittance for the light beam through the use of an optical absorption agent, there can be given a method wherein pigments and dyes having an absorption band in a prescribed wavelength region are made contained in the aforementioned sheet-shaped body. Examples of a method to make pigments and dyes contained include a method wherein a resin and pigments and dyes are first mixed and then formed by extrusion, a method wherein a resin and pigments and dyes are dissolved in a solvent and then formed by casting into a sheet or a film, a method wherein metal ions having an absorption band in a specific wavelength region are dispersed within monomers that are to be formed polymers, and thereafter polymerization is carried out so as to form into the shape of a sheet.

For pigments and dyes, metallic complex based pigments including dithiol-nickel complex based pigments, diimmonium based pigments, aminium based pigments, phthalocyanine based pigments or such can be utilized.

As an example of a method of controlling the transmittance for the light beam through the use of a reflection film for the near-infrared light, there can be given a method wherein a metal film, a metal oxide film or a layered film of these films is formed on a surface of a sheet-shaped body, which makes the light in the near-infrared wavelength region reflect therefrom. For a metal to form a metal film, gold, silver or such can be utilized. For a metal oxide to form a metal oxide film, titanium oxide, zinc oxide, ITO (Indium Tin Oxide) or such can be utilized.

Numerous linear conductive elements arrayed on the surface of the sheet-shaped body can be made of a conductive ink, various kinds of metals or the like. Examples of an arraying method include a method wherein patterns are printed with a conductive ink; a method wherein a metal film is formed on a surface of a sheet-shaped body and then etching is applied to the metal film; a method wherein metal lines are arrayed with a constant pitch on a sheet-shaped body. As a metal for use in etching, there can be taken copper, an alloy whose main component is copper, nickel or the like. As metal lines, there can be taken metal lines made of tungsten, stainless steel, copper, an alloy whose main component is copper, aluminium or the like.

For a method of joining metal lines and a sheet-shaped body together, a bonding method with an adhesive or a bonding method with an ultraviolet curable resin can be employed. In addition, if the sheet-shaped body is made of a thermoplastic resin, a method of burying metal lines into the sheet-shaped body by a press can be employed.

Figure 2:
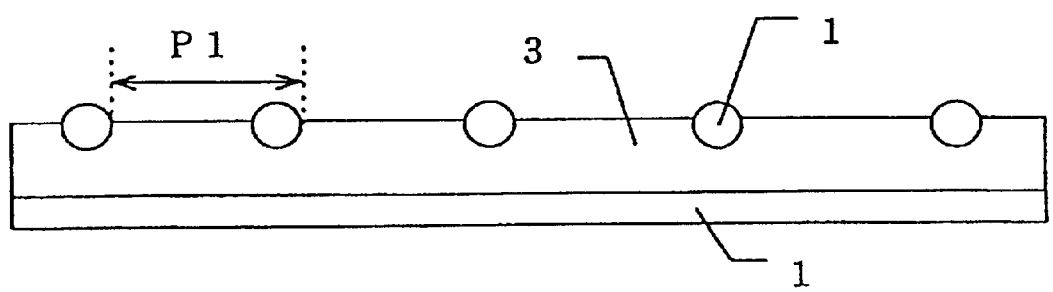
FIGS. 2 to 4 are other examples of a cross-sectional view, each showing a filter of the present invention.
Figure 3:
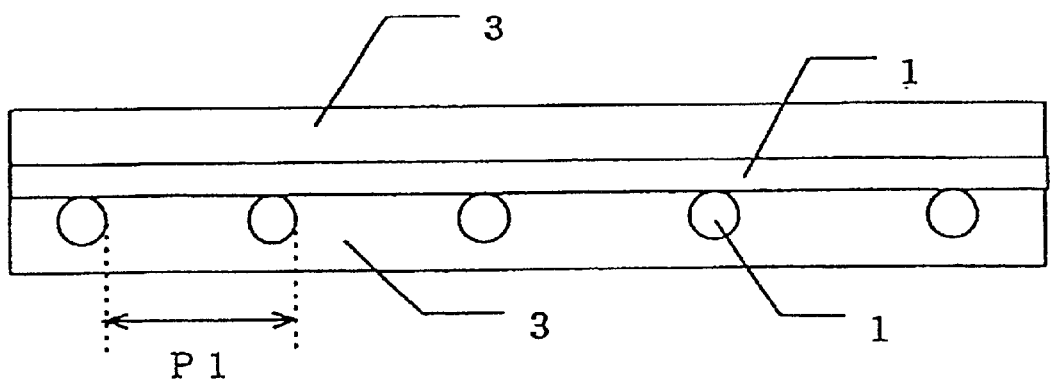
Figure 4:
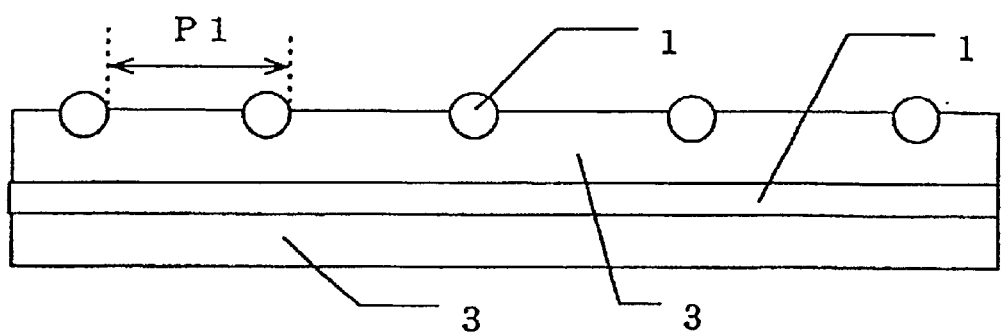

In a filter of the present invention, numerous linear conductive elements are arrayed, on a surface of a sheet-shaped body, in two directions with a pitch P1 and a pitch P2, respectively, and those conductive elements and sheet-shaped body are joined together. With respect to the structure of the filter, numerous linear conductive elements may be arrayed in two directions on one side of one layer of a sheet-shaped body and then joined together, as shown in FIG. 1, or numerous linear conductive elements may be arrayed on both surfaces of a sheet-shaped body, respectively, as shown in FIG. 2. Further, a sheet-shaped body which is joined together with numerous linear conductive elements arrayed thereon in a direction and another sheet-shaped body which is joined together with numerous linear conductive elements arrayed thereon in a direction may form layers. In this case, layers may be formed so as to have a structure wherein conductive elements are arrayed on the side of the interior, as shown in FIG. 3, or a structure wherein one group of conductive elements are arrayed on the side of a surface, as shown in FIG. 4. In FIGS. 1 to 4, herein, members that are indicated by referential numerals 1 and 3 represent a conductive element and a sheet-shaped body, respectively.

Further, it is possible to array numerous linear conductive elements in three or more directions. On that occasion, pitches in two arbitrary directions among a number of directions are taken to be P1 and P2.

A linewidth of the conductive elements is set to be 50 μm or less. Although a larger linewidth are preferable, viewed from the point of shielding characteristic of the electromagnetic waves, lines wider than 50 μm become disadvantageously visible.

An aperture ratio of the filter is set to be not less than 70% and, preferably, not less than 75%. The aperture ratio is a ratio of a light-transmittable section seen from the filter face direction, representing a ratio of a light-transmittable section per unit area. When the aperture ratio is less than 70%, the amount of transmitted light becomes low and the performance of the filter becomes disadvantageously poor.

In a filter wherein a transparent sheet-shaped body and numerous linear conductive elements arrayed thereon are joined together, even if the linewidth and pitches of conductive elements are set so as to make the aperture ratio become 70% or greater, the arrays of metal lines, unlike meshes, show no disorder, which is advantageous.

The surfaces of the conductive elements are preferably blackened, as it reduces the reflection of the light and, thus, the discomfort glare.

In the case that the patterns are printed with a conductive ink, there may be taken a method wherein patterns are printed with a conductive ink and thereon patterns are again printed with a black ink, or a method wherein patterns are printed with a black conductive ink.

In the case of an etching method wherein, after a metal film of copper or such is formed on a substrate and a resist layer is formed, thereon, into patterns, a region of the metal film on which no resist layer is formed is removed by an etchant, a method using a black resist can be employed.

In the case that the surfaces of metal lines are to be blackened, there may be taken a method wherein, in fabrication, metal lines are covered with a black polymer, a method wherein metal lines are coated with a black conductive coating material into which carbon particles are dispersed, a method wherein the surfaces of metal lines are subjected to a chemical treatment or the like so that they may become partially oxidized and blackened. In addition, a method wherein black metal lines made of tungsten or the like are utilized can be taken.

Figure 5:
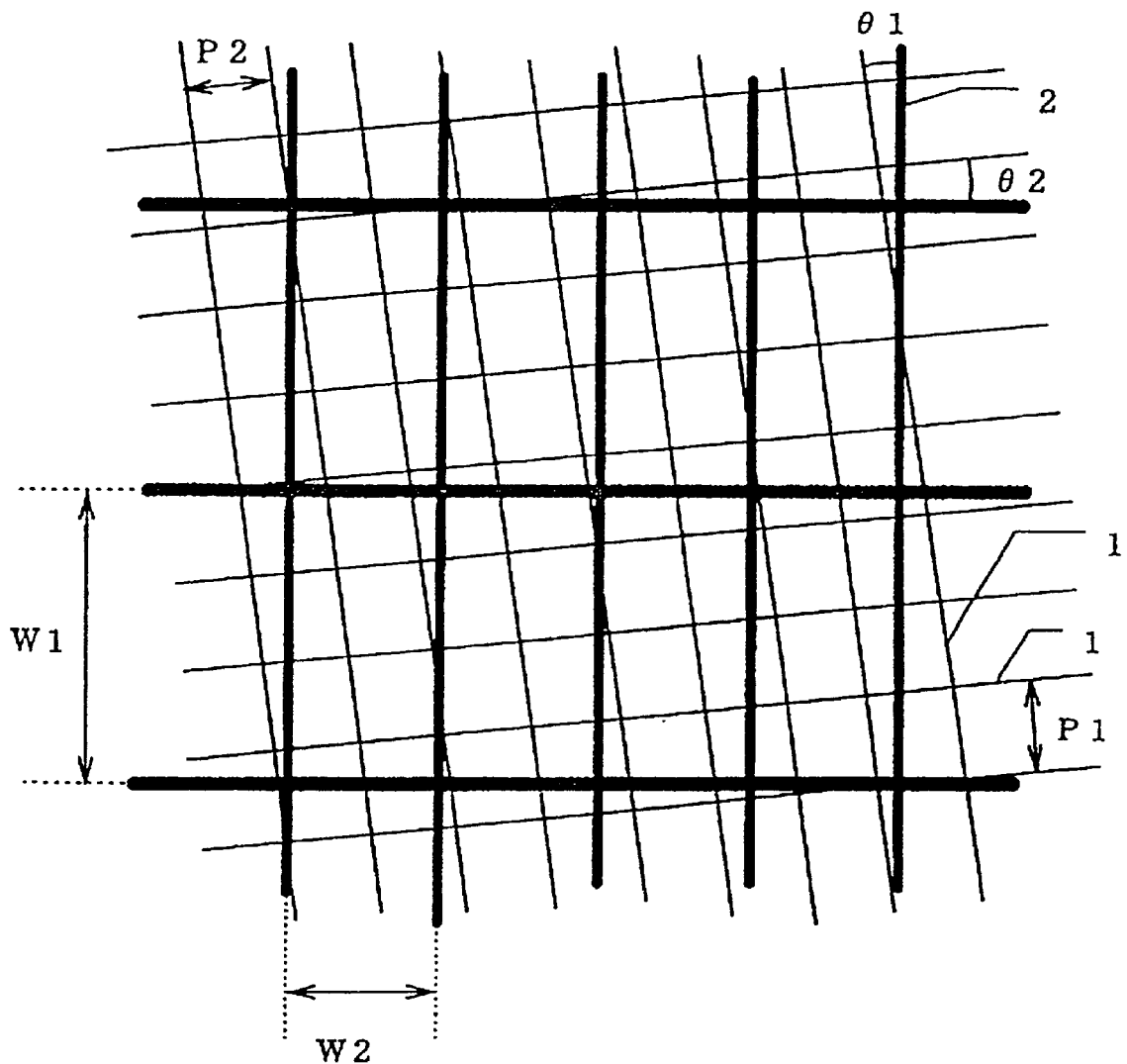
FIG. 5 is a plan view showing an example of a case in that a filter of the present invention is attached to an image device.

FIG. 5 is an example of a plan view showing an arrangement in which a filter of the present invention is placed in front of an image device having rectangular pixels. Examples of an image device having rectangular pixels include a PDP, a liquid crystal panel and a Braun tube. In FIG. 5, lines indicated by referential numerals 1 and 2 represent a conductive element and a borderline between pixels in the image device, respectively.

When lengths of a pixel of the image device in the vertical direction Y and in the horizontal direction X are denoted by W1 and W2, respectively, P1, P2, W1 and W2 satisfy one of the relations expressed by the equations, that is, both Equation (1) and Equation (2), both Equation (3) and Equation (4), both Equation (5) and Equation (6), or both Equation (7) and Equation (8).

Herein, Equation (1) and Equation (2) as well as Equation (3) and Equation (4) are equations relating to cases in which, with respect to the image device, the direction of the length for numerous linear conductive elements arrayed with a pitch P1 is closer to the horizontal direction X than the vertical direction Y, and the direction of the length for numerous linear conductive elements arrayed with a pitch P2 is closer to the vertical direction Y than the horizontal direction X.

On the other hand, Equation (5) and Equation (6) as well as Equation (7) and Equation (8) are equations relating to cases in which, with respect to the image device, the direction of the length for numerous linear conductive elements arrayed with a pitch P1 is closer to the vertical direction Y than the horizontal direction X, and the direction of the length for numerous linear conductive elements arrayed with a pitch P2 is closer to the horizontal direction X than the vertical direction Y.

When P1, P2. W1 and W2 satisfy the above relations, if this filter is disposed in front of the image device in such a way that borderlines between pixels, in other words, the vertical direction Y and the horizontal direction X of the image device may become parallel to respective directions of the lengths for linear conductive elements, the moire that may be observed becomes remarkably little. When P1, P2. W1 and W2 do not satisfy any of the above relations, if the borderlines between pixels become parallel to respective directions of the lengths for linear conductive elements, the moire unfavorably becomes conspicuous.

Further, the filter has preferably P1 and P2 that are different in length, and, hereat, more preferably P1 and P2 with either P1/P2 of not less than 1.05 or P1/P2 of not greater than 0.95.

Compared with conductive elements having the same value for both of the pitch P1 and the pitch P2, conductive elements whose pitch P1 and pitch P2 are set to have different values as described above can be applied to a wider range of image devices. In effect, conductive elements designed for one specific image device can be applied, in certain cases, to other image devices with a pixel size different from the one of that specific image device, by turning 90 degrees clockwise or anti-clockwise, with respect to the designed standard state.

Further, the filter is preferably disposed in front of the image device in such a way that each of narrower acute angles formed by respective directions of the lengths for the linear conductive elements arrayed on the filter with the vertical direction Y and the horizontal direction X of the image device may be set within a range of from 0 to 18 degrees. Further, these angles are more preferably set to be not less than 3 degrees. Further, these angles are more preferably set to be not greater than 15 degrees.

FIG. 5 illustrates an example in which the directions of the lengths of linear conductive elements form angles θ1 and θ2 anti-clockwise with respect to the vertical direction Y and the horizontal direction X of the image device, respectively. In respect of θ1 and θ2, it is possible to set one of them to be an angle clockwise and the other, an angle anti-clockwise. The filter is, hereat, more preferably disposed at angles described above so as to make the moire more inconspicuous.

A filter of the present invention is well suited to the filter for the frontal surface plate of the PDP. When this filter is utilized as a frontal surface plate of a PDP, an anti-reflection film or a non-glare film may be stuck, according to circumstances, onto the filter surface facing the observer side when attached to the PDP, and thereby the penetration of the outside light can be reduced. Further, it is possible to suppress the appearance of Newton's rings that may be produced between a glass electrode substrate and a filter, by sticking a similar filter onto the reverse side of the filter face seen from the observer.

Now, with reference to examples, the present invention is described in detail below.

As metal lines, tungsten lines made by Nippon Tungsten Co., Ltd. or SUS lines made by Nippon Seisen Co., Ltd. were used. For a transparent film, a non-carrier adhesive film LS 131B (30 μm in thickness) made by Lintec Corporation was employed.

This non-carrier film was wound on a lateral surrounding face of a drum, 400 mm in diameter and 1300 mm in width, and, then, metal lines being wound with a prescribed pitch on the outside of this film, the metal lines and the film were joined together. Two sheets of these films with numerous metal lines arrayed thereon, which were obtained in this way, were laid between transparent acrylic resin plates (300×300 mm) with a thickness of 1.5 mm and with a thickness of 0.2 mm, through the use of a roll laminator and thereby a filter was fabricated.

This filter was placed over the frontal surface of a PDP (made by Fujitsu General Limited) at a distance of 3 mm, and the states of the moire appearance were observed at every angle. Pixels of the PDP have a length W1 of 1080 μm in the vertical direction Y and a length W2 of 360 μm in the horizontal direction X. A narrower angle between angles formed by metal lines arrayed with a pitch P1 with the horizontal direction X is denoted by θ2, and a narrower angle between angles formed by metal lines arrayed with a pitch P2 with the vertical direction Y is denoted by θ1.

EXAMPLE 1

As metal lines, tungsten lines with a thickness of 30 μm were used. A filter having a pitch P1 of 234 μm, a pitch P2 of 256 μm and an aperture ratio of 77.0% was fabricated and then disposed at θ1 of 10 degrees and θ2 of 10 degrees. The moire was not visible. W1/P1, W2/P2, θ1, θ2 and the relation to the moire are presented in Table 1.

EXAMPLE 2 to EXAMPLE 4

Except conditions listed in Table 1, a filter was, in each case, fabricated and disposed in the same way as Example 1. The moire was not visible in any Example.

EXAMPLE 5

Except conditions listed in Table 1, a filter was fabricated and disposed in the same way as Example 1. The moire was not visible.

In comparison with Example 1, some reflection of the light from metal lines was observed.

EXAMPLE 6

A length and a width of acrylic resin plates were set to be the size of the frontal surface of a PDP. Further, the acrylic resin plate with a a thickness of 1.5 mm was made to contain 0.21 g/m$^2$ of IRG022 made by Nippon Kayaku Co., Ltd. as diimmonium based pigments and 0.22 g/m$^2$ Of SIR 159 made by Mitsui Chemicals, Inc. as dithiol-nickel complex based pigments and thereby was provided with a near-infrared absorption characteristic. The average transmittance of these plates for the light beam was not lower than 50% in the wavelength range of from 400 to 650 nm, and was not greater than 15% in the wavelength range of from 850 to 1000 nm. Using these acrylic resin plates, a filter was fabricated and disposed in the same way as Example 1, except conditions listed in Table 1. The moire was not visible. Moreover, a remote control box for the PDP demonstrated normal operations.

Case 1 for Comparison

Except conditions listed in Table 1, a filter was fabricated and disposed in the same way as Example 1. The moire was observed. Further, compared with Example 1, an aperture ratio was low so that images were dark. Moreover, metal lines were easily recognizable.

Case 2 for Comparison to Case 5 for Comparison

Except conditions listed in Table 1, a filter was, in each case, fabricated and disposed in the same way as Example 1. The moire was observed in every case.

TABLE 1

| | Metal Line | Diameter of Metal Line | P1 | W1/P1 | P1/W1 | P2 | W2/P2 | P2/W2 | Aperture Ratio | θ1 | θ2 |
|---|---|---|---|---|---|---|---|---|---|---|---|
| Example 1 | Tungsten | 30 μm | 234 μm | 4.62 | — | 256 μm | 1.41 | — | 77.0% | 10 degrees | 10 degrees |
| Example 2 | Tungsten | 20 μm | 234 μm | 4.62 | — | 256 μm | 1.41 | — | 84.3% | 15 degrees | 10 degrees |
| Example 3 | Tungsten | 15 μm | 245 μm | 4.41 | — | 150 μm | 2.40 | — | 84.5% | 10 degrees | 5 degrees |
| Example 4 | Tungsten | 40 μm | 1510 μm | — | 1.40 | 1300 μm | — | 3.61 | 94.4% | 10 degrees | 15 degrees |
| Example 5 | SUS304 | 30 μm | 234 μm | 4.62 | — | 256 μm | 1.41 | — | 77.0% | 10 degrees | 10 degrees |
| Example 6 | Tungsten | 20 μm | 234 μm | 4.62 | — | 256 μm | 1.41 | — | 84.3% | 15 degrees | 10 degrees |
| Comparison 1 | Tungsten | 60 μm | 234 μm | 4.62 | — | 211 μm | 1.71 | — | 53.2% | 15 degrees | 10 degrees |
| Comparison 2 | Tungsten | 20 μm | 234 μm | 4.62 | — | 211 μm | 1.71 | — | 82.8% | 15 degrees | 10 degrees |
| Comparison 3 | Tungsten | 20 μm | 234 μm | 4.62 | — | 276 μm | 1.30 | — | 84.8% | 15 degrees | 10 degrees |
| Comparison 4 | Tungsten | 20 μm | 256 μm | 4.20 | — | 234 μm | 1.53 | — | 84.3% | 10 degrees | 15 degrees |
| Comparison 5 | Tungsten | 20 μm | 211 μm | 5.12 | — | 234 μm | 1.53 | — | 82.8% | 10 degrees | 15 degrees |

We claim:

1. A transparent filter comprising a sheet-shaped body and numerous linear conductive elements arrayed on a surface thereof, which is adapted to be disposed in front of an image device having rectangular pixels; wherein the conductive elements with a linewidth of 50 μm or less are arrayed on the sheet-shaped body in two directions with a pitch P1 and a pitch P2, respectively; an aperture ratio of the filter is not less than 70%; and when lengths of a pixel of the image device in vertical direction Y and in horizontal direction X are denoted by W1 and W2, respectively, P1, P2, W1 and W2 satisfy one of relations expressed by following equations, that is, both Equation (1) and Equation (2), both Equation (3) and Equation (4), both Equation (5) and Equation (6), or both Equation (7) and Equation (8), $$n1+0.35 \leq W1/P1 \leq n1+0.65 \quad (1)$$

$$n2+0.35 \leq W2/P2 \leq n2+0.65 \quad (2)$$

$$n1+0.35 \leq P1/W1 \leq n1+0.65 \quad (3)$$

$$n2+0.35 \leq P2/W2 \leq n2+0.65 \quad (4)$$

$$n1+0.35 \leq W1/P2 \leq n1+0.65 \quad (5)$$

$$n2+0.35 \leq W2/P1 \leq n2+0.65 \quad (6)$$

$$n1+0.35 \leq P1/W2 \leq n1+0.65 \quad (7)$$

$$n2+0.35 \leq P2/W1 \leq n2+0.65 \quad (8)$$

(Each of n1 and n2 is an integer from 1 to 5).

2. The filter according to claim 1, wherein P1 and P2 are different in length.

3. The filter according to claim 2, wherein either P1/P2 is not less than 1.05 or P1/P2 is not greater than 0.95.

4. The filter according to claim 1, wherein linear conductive elements are metal lines.

5. The filter according to claim 1, wherein the surface of conductive elements are blackened.

6. The filter according to claim 1, wherein an average transmittance of the sheet-shapad body for a light beam is not higher than 30% in a wavelength range of from 850 to 1000 nm and not lower than 40% in a wavelength range of from 400 to 650 nm.

7. A multi-layered filter comprising layers of the filter according to claim 1 and a sheet-shaped body whose average transmittance for a light beam is not higher than 30% in a wavelength range of from 850 to 1000 nm and not lower than 40% in the wavelength range of from 400 to 650 nm.

8. An image device with a filter, wherein the filter is the filter according to claim 1, being disposed in such a way that narrower acute angle θ1 which is formed by the directions of lengths for the linear conductive elements thereon with vertical direction Y of the image device, and narrower acute angle θ2 which is formed by the directions of lengths for the linear conductive elements thereon with horizontal direction X of the image device, respectively, are set within a range of 0 to 18 degrees.

9. The image device according to claim 8, wherein each of the angles θ1 and θ2 is set within a range of from 3 to 18 degrees.

10. The device according to claim 8, wherein the image device is a plasma display panel.

* * * * *